(12) United States Patent
Asenkerschbaumer et al.

(10) Patent No.: US 8,096,604 B2
(45) Date of Patent: Jan. 17, 2012

(54) ENERGY ABSORBER FOR USE AS IMPACT PROTECTION IN A MOTOR VEHICLE

(75) Inventors: Dominik Asenkerschbaumer, Neuotting (DE); Klaus Unterreiner, Geisenhausen (DE); Thomas Sperl, Landau a. d. Isar (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 353 days.

(21) Appl. No.: 12/178,673

(22) Filed: Jul. 24, 2008

(65) Prior Publication Data
US 2009/0026800 A1 Jan. 29, 2009

(30) Foreign Application Priority Data

Jul. 24, 2007 (DE) .......................... 10 2007 034 313
Nov. 29, 2007 (DE) ..................... 20 2007 016 671 U

(51) Int. Cl.
B60R 21/04 (2006.01)
(52) U.S. Cl. ............ 296/146.6; 296/187.12; 296/187.05
(58) Field of Classification Search ............... 296/146.7, 296/146.5, 146.6, 187.03, 187.12, 187.05; 280/748, 751
See application file for complete search history.

(56) References Cited

U.S. PATENT DOCUMENTS

| | | | |
|---|---|---|---|
| 4,769,951 A * | 9/1988 | Kaaden | 49/502 |
| 4,948,196 A | 8/1990 | Baba et al. | |
| 5,660,426 A | 8/1997 | Sugimori et al. | |
| 5,806,889 A * | 9/1998 | Suzuki et al. | 280/748 |
| 5,820,191 A * | 10/1998 | Blakewood et al. | 296/37.13 |
| 5,857,702 A * | 1/1999 | Suga et al. | 280/751 |
| 6,203,096 B1 * | 3/2001 | Noda et al. | 296/146.6 |
| 6,258,465 B1 | 7/2001 | Oka et al. | |
| 7,125,067 B2 | 10/2006 | Bonnett et al. | |
| 7,562,929 B2 | 7/2009 | Schiebel et al. | |
| 2005/0225115 A1 | 10/2005 | Wallströ m et al. | |
| 2007/0228776 A1 | 10/2007 | Schiebel et al. | |

FOREIGN PATENT DOCUMENTS

| | | |
|---|---|---|
| DE | 195 05 935 B4 | 8/1995 |
| DE | 196 15 875 A1 | 10/1997 |
| DE | 198 30 560 A1 | 5/1999 |
| DE | 10 2006 014 961 A1 | 10/2007 |

* cited by examiner

*Primary Examiner* — Glenn Dayoan
*Assistant Examiner* — Melissa A Black
(74) *Attorney, Agent, or Firm* — Wolf, Greenfield & Sacks, P.C.

(57) ABSTRACT

An energy absorber for use as impact protection in a motor vehicle, in particular in the region of the doors, is provided. The energy absorber can be formed as a plastics material component and comprises a plurality of ribs which together form polygonal hollow chambers. In manufacturing the energy absorber, a tool parting line of the manufacturing tool is defined such that the parting line defines at least two regions of the energy absorber displaying differing energy absorption characteristics. Upon impact, the energy absorber follows a force/distance curve which first rises linearly and then continues constantly.

20 Claims, 5 Drawing Sheets

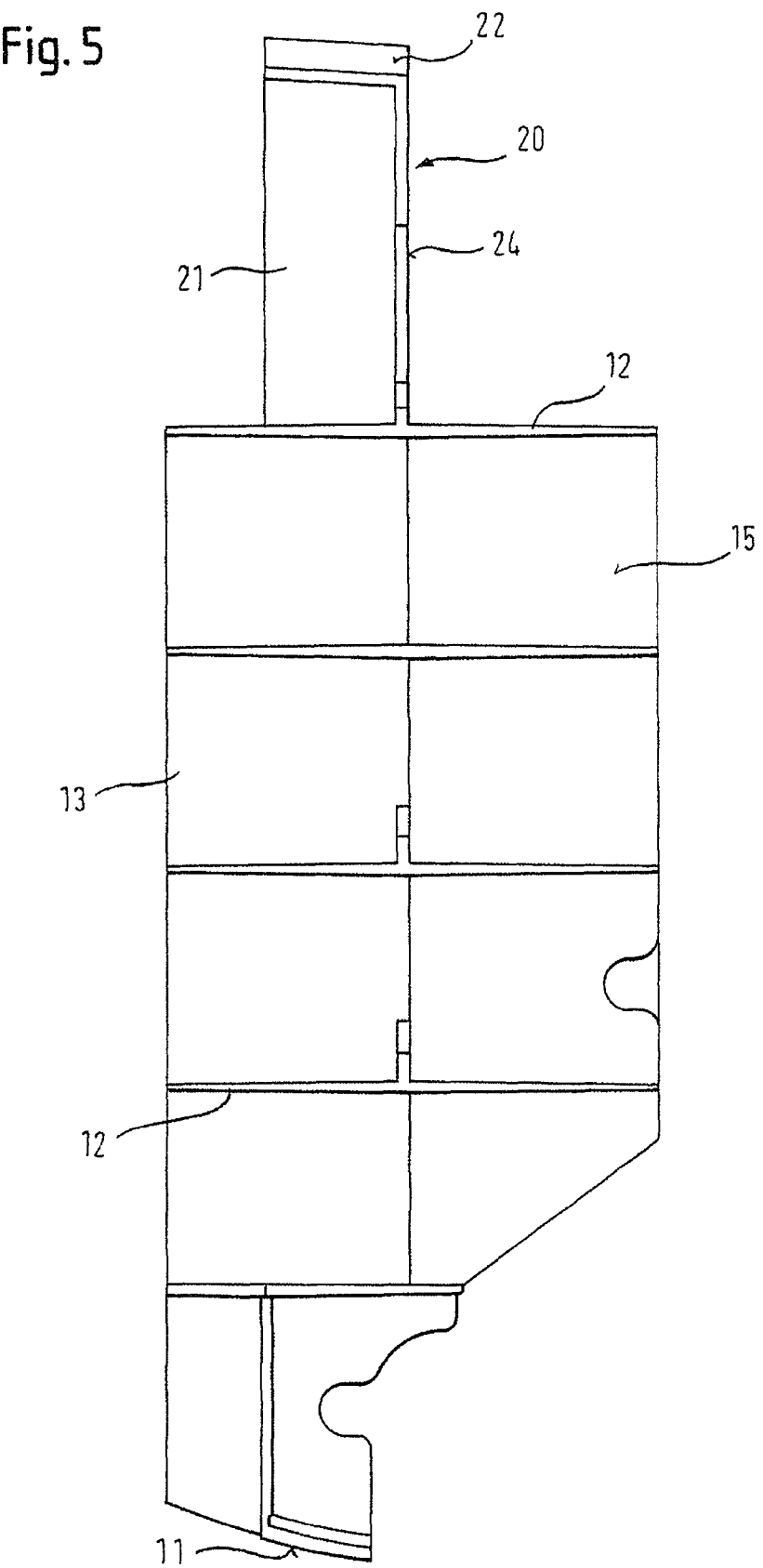

ENERGY ABSORBER FOR USE AS IMPACT PROTECTION IN A MOTOR VEHICLE

CROSS REFERENCE TO RELATED APPLICATIONS

Foreign priority benefits are claimed under 35 U.S.C. §119 (a)-(d) or 35 U.S.C. §365(b) to German Application No. 10 2007 034 313.4, filed Jul. 24, 2007, and to German Application No. 20 2007 016 671.0, filed Nov. 29, 2007 which are hereby incorporated by reference in its entirety.

BACKGROUND

1. Field

The present invention relates to an energy absorber for use as impact protection in a motor vehicle, in particular in the region of the doors.

2. Discussion of Related Art

Impact protection of this type serves primarily to protect vehicle occupants from serious injuries in the event of a collision. Some impact protection devices serve not to absorb energy produced during impact between the motor vehicle and a corresponding collision object, for example another car, but rather to absorb energy produced in the event of a collision on the impact of a vehicle occupant on for example the inner lining of a door.

Foam pads disposed after the inner lining of a door have been used to absorb this energy and offer some protection to the vehicle occupant. Foam pads of this type have a constant density distribution. In addition, the force transmitted to the vehicle occupants continues to increase as the deformation of the foam pad increases because the foam pad can absorb less and less energy with increasing deformation.

Furthermore, the safety requirements for motor vehicles in various countries are subject to differing guidelines. In Europe, many tests are carried out based on the Euro NCAP (European New Car Assessment Programme) Guidelines, whereas in the United States, the IIHS (Insurance Institute for Highway Safety) Guideline is widely used. These guidelines define differing maximum forces to which vehicle occupants may be subjected and also differ in terms of the positions at which these maximum forces may act. Vehicle manufacturers themselves may set additional standards to be met by the energy absorber.

The typical foam pad described above defines the same maximum forces at all positions over its width due to its uniform density, rendering it incapable of fulfilling both the above-mentioned standards at the same time and those of the vehicle manufacturers. Therefore, differing foam pads are typically used for a single vehicle for differing countries in order to comply with the respective standards.

Some prior art are energy absorbers include conical or pyramid-shaped absorption elements which telescope on impact in order to absorb the energy. An energy absorber of this type is known for example from DE 39 19 742 A1 (corresponds to U.S. Pat. No. 4,890,877). Although this configuration is an improvement on the previously used foam pads, a need still exists for an improved energy absorber that can meet both of the above-mentioned guidelines and also the vehicle manufacturer requirements.

SUMMARY

In one illustrative embodiment, an energy absorber for use as impact protection in a door region of a motor vehicle is provided. The energy absorber includes a plurality of ribs integrally connected to one another. The ribs form at least one hollow chamber having a polygonal cross-section.

In another illustrative embodiment, a method for manufacturing an energy absorber is provided. The method includes providing a manufacturing tool and defining a tool parting line of the manufacturing tool. The parting line defines at least two regions of the energy absorber displaying differing energy absorption characteristics.

In yet another illustrative embodiment, an energy absorber for an automotive vehicle door is provided. The energy absorber includes a crushing force-displacement characteristic comprising a first crushing force-displacement characteristic zone and a second crushing force-displacement characteristic zone. In the first crushing force-displacement characteristic zone, a crushing force rises, within a linear window, with increasing displacement. In the second crushing force-displacement characteristic zone, the crushing force remains substantially constant, within a constant window, with increasing displacement.

Further features and advantages of the present invention, as well as the structure of various embodiments of the present invention are described in detail below with reference to the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labelled in every drawing. Various embodiments of the invention will now be described, by way of example, with reference to the accompanying drawings, in which:

FIG. 5 is a side view of one embodiment of the energy absorber showing a parting line of a tool used to form the energy absorber.

DETAILED DESCRIPTION

Figure 1:
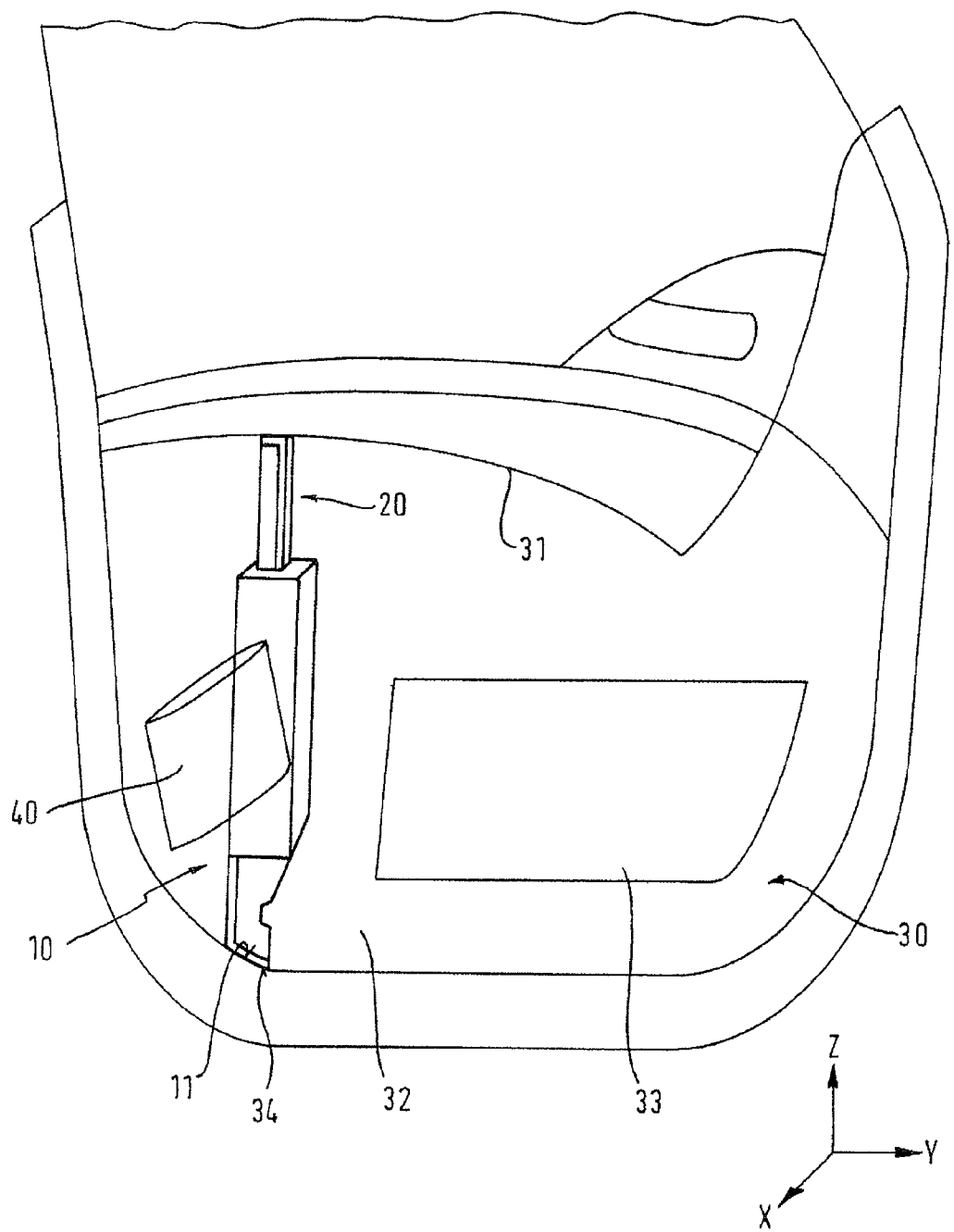
FIG. 1 is a schematic representation of a door inner lining with an energy absorber.

In addition to the above-mentioned Euro NCAP and the IIHS Guidelines, an additional vehicle manufacturer and/or supplier guideline requires a target threshold or window (also referred to herein as band or corridor) for the force/distance curve of the interior components, especially for front, lateral and pole impact. This target window is defined in such a way that initially on deformation of interior components, for example a door having an energy absorber, there is a substantially linear rise in force which then remains substantially constant for a given deformation. Embodiments of the energy absorber meets both the Euro NCAP and the IIHS Guidelines to be met while at the same time allowing a force/distance curve which first rises linearly and then continues constantly.

In one embodiment, the energy absorber is formed as a unitary component made of a plastic material. In one embodiment, the energy absorber is formed as an injection-molded part. The energy absorber may comprise a honeycomb-like structure, which can be varied to produce energy absorbers meeting at least two of the above-mentioned guidelines. Other suitable configurations may be employed (such as a multi-piece energy absorber), as the present invention is not limited in this respect.

In one embodiment, the energy absorber includes a plurality of ribs which together form polygonal hollow chambers. This construction offers, in addition to the possibility of simple and cost-effective manufacture, the option of adapting the structure to a broad range of conditions (for example a broad range of types of vehicle) while time complying with both the Euro NCAP and the IIHS Guidelines. In one embodiment, by selecting the number and position of the transverse extension (in the vehicle Y direction) of the ribs and, in one embodiment, selecting the wall thickness or the ribs, the energy absorption behavior may be influenced without altering the basic construction (for example, the outer contour of the energy absorber). Differing energy absorption properties can also be achieved in differing regions in the longitudinal or transverse extension of the ribs. The latter aspect may be necessary if the differing guidelines or standards to be met require at differing positions differing energy absorption behaviour which cannot be compensated for by the remaining constituent parts of the interior components.

In one embodiment, the parting line of the injection mold used to manufacture the energy absorber can be utilized. For example, differing configurations can be selected on either side of the parting line. In addition, a flexible manufacturing process can be employed. In this regard, by changing the configuration of the one side of the tooling, changes in individual regulations, guidelines or standards can be accommodated because only the corresponding half of the tool has to be renovated or adapted. It should be appreciated that other suitable manufacturing methods may be employed, as the present invention is not limited in this respect.

In addition, the configuration of an embodiment of the energy absorber as a one-piece component offers further advantages. In this embodiment, there is great freedom with regard to the fastening of the energy absorber to the door. Conceivable in this regard are bonding, screwing or clip connections, etc, as the present invention is not limited in this respect. With prior art energy absorbers, fastening is usually restricted to bonding or screwing. Further, additional elements or features may be formed in the energy absorber. For example, cable fixings to which cables may be fastened. Such cables may extend in the door and may be used to power speakers, the window lift and/or other electrical components. It should be appreciated that the invention is not limited in this regard, as these other such features need not be formed in the energy absorber.

According to an embodiment, the hollow chambers are rectangular in cross section. For example, the ribs include transverse ribs extending in the vehicle in the X direction and longitudinal ribs extending in the Z direction, the longitudinal extension of the respective ribs extending in the direction. In one embodiment, the longitudinal ribs can be configured so as to limit the amount or eliminate of buckling in the Z direction, thus allowing the energy absorption to be adjusted almost exclusively by the number, positioning, and/or configuration of the transverse ribs. Possible configurations may in this case be concave, convex, angular or other changes in shape in order to predefine a buckling region or buckling-in regions. Other suitable configurations may be employed, as the present invention is not limited in this respect.

As mentioned, in one embodiment, the configuration of the energy absorber is divided in the Y direction into two portions, the division being defined by the division (i.e., parting line) of the tool. In one embodiment, the number and positioning of the ribs, but also the wall thickness thereof, in each of the two halves can be configured differently. This allows differing energy absorption properties to be achieved at differing positions, thus helping to adapt the energy absorber to the differing standards or guidelines by simply exchanging the corresponding half of the tool. Of course, the present invention is not limited in this regard, as each half of the energy absorber can be configured in the same way.

In one embodiment, the thickness or the wall thickness of the transverse ribs are variable (i.e., they taper), and in one embodiment, the thickness of the transverse ribs are than that of the longitudinal ribs. In one embodiment, the wall thickness of the individual ribs is in a range between approximately 1.0 mm and 3.0 mm. In one embodiment of the rectangular cross section, the transverse ribs have a thickness in the range between approximately 1.0 mm and 2.0 mm, and in one embodiment, approximately 1.5 mm. The thickness of the longitudinal ribs, in one embodiment, is in a range between approximately 2.0 mm and 3.0 mm, and in one embodiment, approximately 2.5 mm.

In one embodiment, the energy absorber is formed of PCABS (polycarbonate acrylic butadiene styrene). It will however be understood in the inventive sense that use may be made also of other materials having a high elongation at break, for example ABS, polypropylene or corresponding metals such as aluminium, magnesium and alloys thereof. The term "elongation at break" refers in this case to the material characteristic value from the established tensile test (ISO 527, EN 10002-1, -5 and ISO 6892) which classifies the deformation strength of a material, that is to say its elongation property, until the material tears or breaks. In one embodiment, the material has an elongation at break greater than 10%. It should be appreciated that the present invention is not limited to any particular material or elongation, as any suitable material and any suitable elongation may be used.

A problem arises when the energy absorber needs to be adapted to the requirements of the motor vehicle manufacturers, e.g., to the defined target corridor and when the energy absorber is located, in a particularly preferred embodiment, directly below the armrest of the door lining. Previously, in the prior art the armrest was rigidified by separate elements to prevent deformation in the event of force being applied in the Z direction to the armrest. This usually involved forming transverse ribs extending in the Y direction integrally with the underside of the armrest. However, these rigidifying ribs extending in the Y direction have a detrimental influence on the absorption of energy in the event of a force acting in the Z direction. As the door inner linings are usually also formed in a mold, it is not possible to provide on the armrest rigidifying ribs extending in the X direction, because it would otherwise not be possible to remove the door lining or the door inner lining from the mold. In order to solve these problems, in one embodiment, a support element for supporting the armrest on one or more ribs on the side of the energy absorber that faces an armrest in the fitted state of the energy absorber. This allows the previously used reinforcing ribs on the underside of the armrest to be omitted and the armrest to be supported by the energy absorber thus configured.

In one embodiment, two supporting walls having substantially the same orientation as the longitudinal ribs are provided. A thickness of the supporting walls, in one embodiment, is equal to or greater than that of the longitudinal ribs. That is, the supporting walls extend, like the longitudinal ribs, in the vehicle Y direction and are configured so as to be substantially buckle-proof in the Z direction. That is to say, if force is applied in the Z direction, the supporting walls are unlikely to buckle, so that the armrest is supported reliably and securely.

To further strengthen this effect, in one embodiment, the supporting walls are integrally connected at their ends remote from the transverse rib(s) via a connecting wall.

In one embodiment, supporting walls can be provided only on one side of the parting line, thus allowing the supporting walls and also the connecting wall to be configured with a greater wall thickness in the region of the tool parting line (i.e., in the region in which the energy absorber is divided into two portions) than in the remaining region of the extension thereof in the Y direction. This causes further rigidifying of the supporting walls or the connecting wall.

As was mentioned at the outset, motor vehicle manufacturers and/or suppliers define a target corridor for the force/distance curve of interior components, especially for front, lateral, pole impact. In order to fall within this target corridor, the transverse ribs can be configured, in one embodiment of the energy absorber, in their number, positioning, and wall thickness in such a way that the force/distance curve first allows a linear rise up to a predetermined force, preferably in a range between approximately 3,000 N and 4,500 N, and then extends constantly over a predetermined distance in accordance with this force.

Turning now to the Figures, and in particular to FIG. 1, a schematic representation of a portion of a door inner lining 30 of a motor vehicle is shown. This door inner lining 30 has a protrusion 32 comprising inter alia a map case 33 and a substantially horizontal surface 31 on which the armrest (not shown) is positioned. Furthermore, the protrusion 32 defines, opposite the surface 31 for the armrest, a lower edge 34.

In one embodiment, the energy absorber 10 (which may also be referred to as a crash pad) is disposed in the region of protrusion 32. In this regard, the energy absorber 10 is disposed in a region in which, in accordance with the respective safety guidelines (Euro NCAP and IIHS), it is expected that the pelvis of a vehicle occupant will strike the door inner lining 30 in the event of lateral impact. This region is denoted in FIG. 1 by reference numeral 40.

An embodiment of the energy absorber 10 will be described hereinafter in detail with reference to FIG. 2. The energy absorber 10 of this embodiment is formed from PCABS (polycarbonate acrylic butadiene styrene) and manufactured by injection-molding. The energy absorber comprises a plurality of transverse ribs 12 and also a plurality of longitudinal ribs 13. These transverse ribs 12 and longitudinal ribs 13 combine to form a profile comprising a plurality of hollow chambers 14. The hollow chambers are configured so as to be polygonal, and in one embodiment rectangular, in cross section, that is to say perpendicularly to the transverse ribs 12 and the longitudinal ribs 13. Other suitable chamber configurations may be employed, as the present invention is not limited in this respect.

In one embodiment, a support element 20 is provided on the top transverse rib 12, that is to say the transverse rib 12 facing the surface 31 for the armrest in the assembled state in FIG. 1. The support element 20 comprises two supporting walls 21 and also a connecting wall 22 joining the ends of the supporting walls 21 that is disposed opposite the ends connected to the transverse rib 12. The supporting wall 21 shown on the right-hand side in FIG. 2 extends, like the supporting wall 21 shown on the left-hand side, substantially in the same direction as the longitudinal ribs 13. However, the supporting wall 21 shown on the right-hand side can, in one embodiment, be kinked, so that this supporting wall is composed of three portions: a first portion parallel to the longitudinal ribs 13 and at a first distance from the supporting wall 21 shown on the left-hand side, a second portion also parallel to the longitudinal ribs 13 but at a second smaller distance from the supporting wall 21 shown on the left-hand side, and a third portion connecting the first two portions. Furthermore, this support element 20 has on one side, on its end face, a reinforcing rib 23 extending along the supporting wall 21 and the connecting wall 22. The reinforcing rib is provided in the region of a division of the tool, that is to say it ends with the tool division of the tool for the energy absorber 10, thus allowing the component to be removed from the mold after shaping. In the embodiment illustrated in FIG. 2, the tool parting line extends along the back face 24, shown on the right-hand side, of the support element 20 in the Z direction.

In order to be able to divert the forces applied to the support element 20 in the Z direction, the energy absorber 10 is, in one embodiment, further supported at the lower edge 34 of the inner lining 30 via a contact surface 11, so that forces exerted on the armrest are diverted via the support element 20 and the longitudinal ribs 13 and also the contact surface 11. For this purpose, the supporting walls 21 are furthermore configured so as to be substantially buckle-proof in the Y direction; this applies equally to the longitudinal ribs 13.

Figure 2:
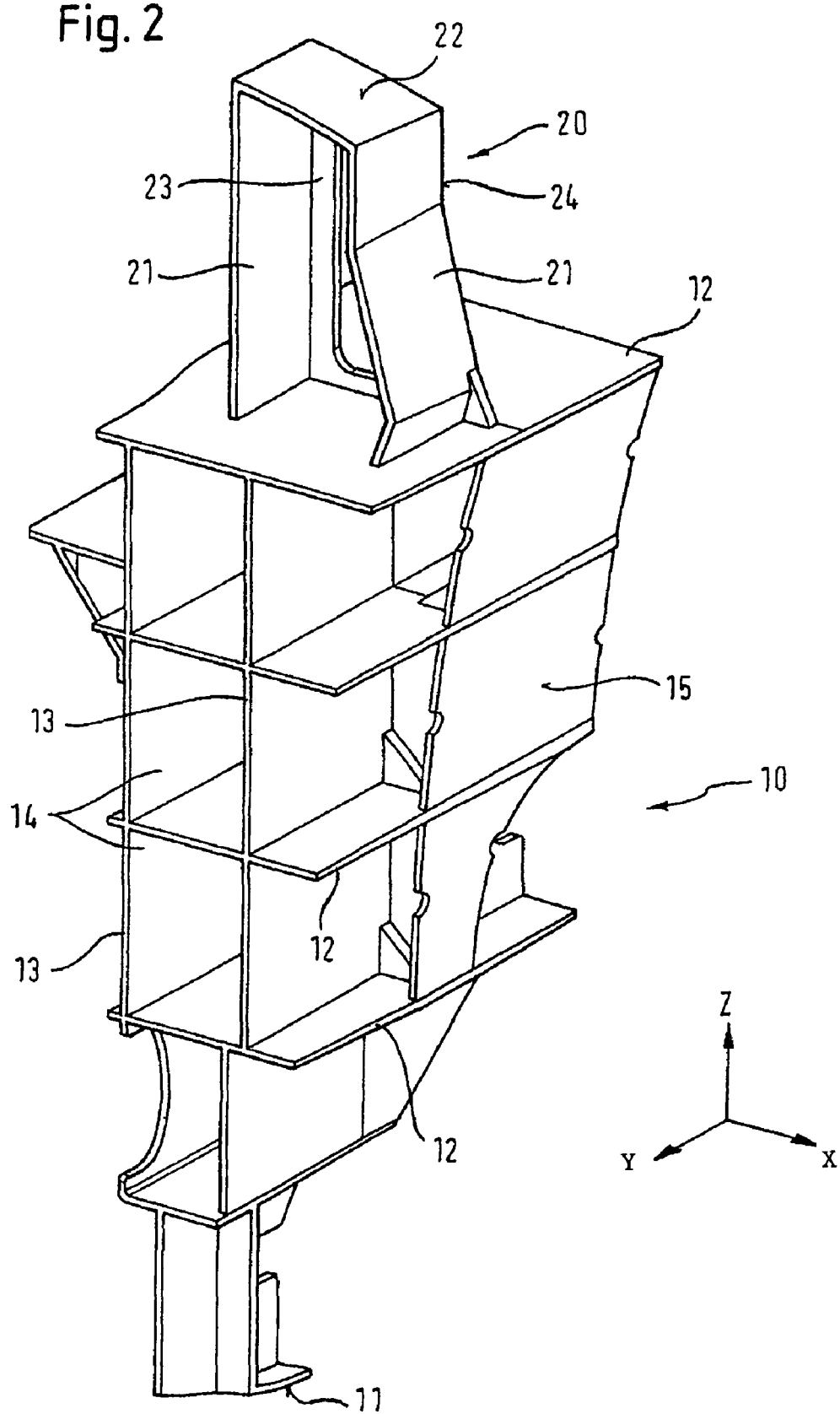
FIG. 2 is a perspective view of one embodiment of the energy absorber.

In one embodiment, the energy absorber 10 rests with its end face 15 (which in FIG. 2 is directed forward) against the inner surface of the protrusion 32 of the door inner lining 30 and is bonded thereto via end face 15. On the opposite side, the energy absorber 10 rests preferably against the door shell, so that, in the event of impacting of a vehicle occupant or his/her pelvis in the region 40 onto the door inner lining 30, deformation of the energy absorber 10 is possible in order to absorb the energy.

Figure 3:
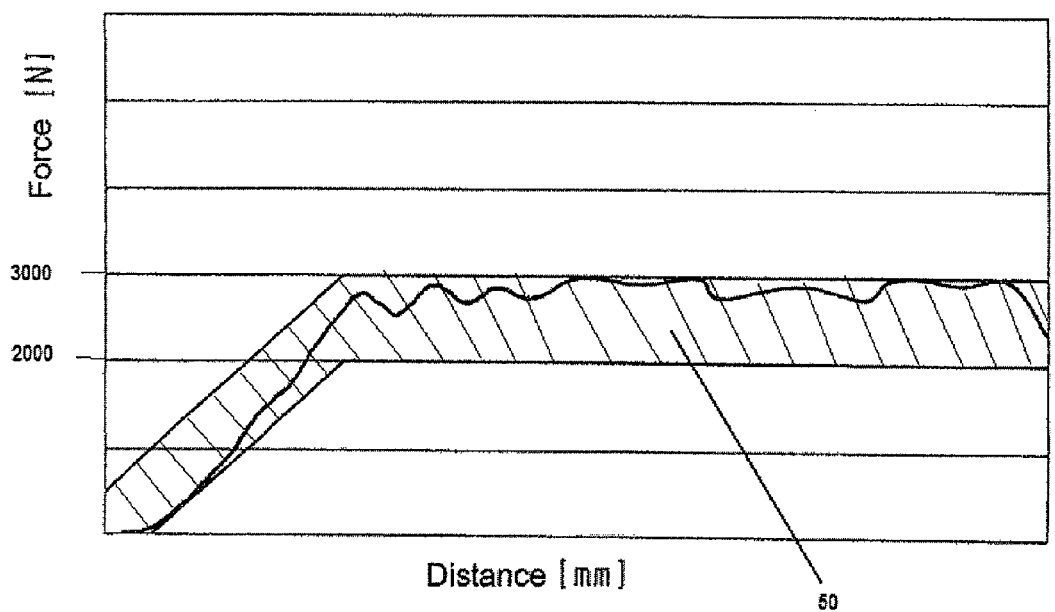
FIG. 3 is a graph showing a target corridor defined by motor vehicle manufacturers for the force/distance curve and an exemplary course of a force/distance curve of one embodiment of the energy absorber.
Figure 4:
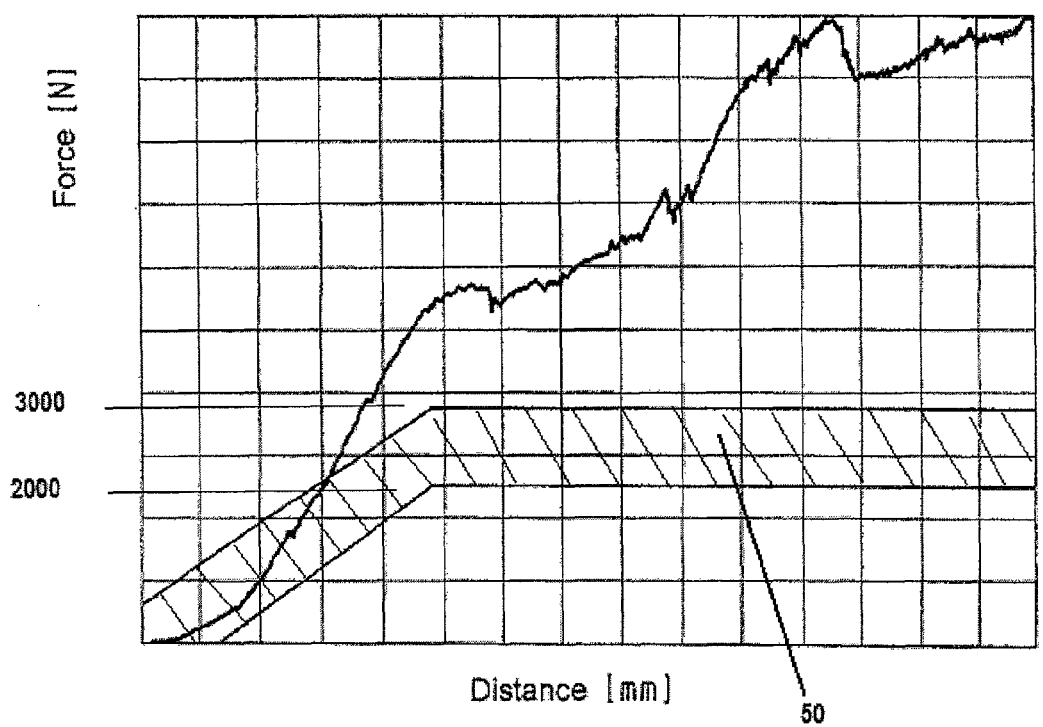
FIG. 4 is a graph showing the target corridor defined by motor vehicle manufacturers for the force/distance curve and the course of the force/distance curve of a prior art crash pad.

In one embodiment, the energy absorber 10 fulfils the requirements of the motor vehicle manufacturers and/or suppliers in that it falls within a defined target corridor of a force/distance course or a force/distance curve. This target corridor 50 is illustrated in cross-hatch by way of example in FIG. 3. It is thus required that in the event of a lateral impact, in which the pelvis of a vehicle occupant strikes the door inner lining 30 in the region 40, the force acting on the pelvis first rises linearly or substantially linearly, wherein the force should rise up to at most 3,000 N and at least 2,000 N. After reaching the preferred force range, a constant force curve should be achieved even in the event of further inward pressing. The target corridor is also shown in FIG. 4; however, as can be seen, the prior art energy absorbers fail to be in the target corridor.

If a pelvis strikes in the region 40 the door inner lining 30, the force transmitted to the pelvis first rises linearly. If a certain force acting on the energy absorber 10 is reached (in the region between 2,000 and 3,000 N), one or more of the transverse ribs 12 buckles away and the associated longitudinal ribs 13 move toward one another. As a result, the force is kept at a constant level or substantially constant level.

The position shown in FIG. 1 of the pelvis in the region 40 is the position in accordance with the Euro NCAP Guideline. If the IIHS Guideline is applied, the position of the pelvis region shifts. In order to be able to comply with both guidelines simultaneously, it may therefore be necessary to configure the energy absorber 10 in the Y direction and Z direction with differing properties with regard to energy absorption behavior. Should this be necessary, in one embodiment, the energy absorber may be optimized by mere selection of the position, number, and thickness of the ribs 12. It is also possible to divide the energy absorber 10 into two different portions in the Y direction, the division being defined by the division of the tool (i.e., on the parting line). That is to say, the dividing line (in the Z direction) of the two halves of the tool can be defined during manufacture in such a way (displaced in the X direction) that on both sides of this division differing positioning, number, and thickness of the ribs 12 is present.

Thus, in one embodiment, the energy absorber provides in the simplest manner a modular design based on which both the Euro NCAP Guideline and the IIHC Guideline can be met in a vehicle. In addition, the energy absorber 10 can be manufactured simply and cost-effectively and has the further advantage that additional elements, such as inter alia the support element 20 and cable fixings for fixing electric lines in the door inner lining 30, can also integrally be provided. In addition, the design is easily adaptable to the correspondingly available overall spaces and highly flexible with regard to fastening thereof to the door inner lining 30. Thus, the energy absorber 10 can be bonded to the door lining 30 via its end face 15. Alternatively, however, screw or clip connections or other types of connections are also conceivable. Depending on requirements, the type of fastening can therefore be selected accordingly.

In addition, the energy absorber 10 according to one embodiment combines the conflicting requirements of a system which, in the event of a lateral impact, collapses in accordance with the defined target corridor and is configured so as to be rigid perpendicularly to the force normally occurring in the event of a lateral impact through the pelvis in the region 40, in order to ensure supporting of the armrest.

Furthermore, as may also be seen from FIG. 5, in the event of changes to standards, guidelines or other regulations, only a partial region of the energy absorber 10 has to be modified in such a way that merely one half of the tool has to be adapted or renovated in order to meet correspondingly altered requirements.

As has become apparent from the foregoing description, the design of the energy absorber can be used highly flexibly and multi-functionally compared to the known prior art and therefore improves the known prior art considerably.

Having thus described several aspects of at least one embodiment of this invention, it is to be appreciated various alterations, modifications, and improvements will readily occur to those skilled in the art. Such alterations, modification, and improvements are intended to be part of this disclosure, and are intended to be within the spirit and scope of the invention. Accordingly, the description and drawings herein are by way of example only.

What is claimed is:

1. An energy absorber for use as impact protection in a door region of a motor vehicle, the energy absorber comprising:
   a plurality of ribs integrally connected to one another, wherein the integrally connected plurality of ribs form at least one hollow chamber with a polygonal cross-section that runs longitudinally with respect to the door when the energy absorber is in a fitted state; and
   a support element for supporting an armrest disposed on a side of the energy absorber comprising walls, a top, and a reinforcing rib perpendicular to the walls defining a hollow chamber that runs longitudinally with respect to the door when the energy absorber is in a fitted state, wherein the support element is adapted to face the armrest when the energy absorber is in a fitted state, and wherein the support element limits buckling in a vertical (Z) direction.

2. The energy absorber according to claim 1, wherein the at least one hollow chamber has a rectangular cross-section.

3. The energy absorber according to claim 1, wherein the ribs extend along a concave, convex, or angular cross-section.

4. The energy absorber according to claim 1, wherein the plurality of ribs further comprises a plurality of transverse ribs and a plurality of longitudinal ribs integrally connected to form a plurality of hollow chambers with polygonal cross-sections.

5. The energy absorber according to claim 4, wherein the plurality of transverse ribs and plurality of longitudinal ribs are of equal thickness.

6. The energy absorber according to claim 5, wherein a thickness of the plurality of transverse ribs and plurality of longitudinal ribs is in a range between approximately 1.0 mm and 3.0 mm.

7. The energy absorber according to claim 4, wherein a thickness of the plurality of transverse ribs is less than a thickness of the plurality of longitudinal ribs.

8. The energy absorber according to claim 7, wherein a thickness of the plurality of transverse ribs is in a range between approximately 1.0 mm and 2.0 mm and is preferably 1.5 mm.

9. The energy absorber according to claim 7, wherein a thickness of the plurality of transverse ribs is approximately 1.5 mm.

10. The energy absorber according to claim 7, wherein a thickness of the plurality of longitudinal ribs is in a range between approximately 2.0 mm and 3.0 mm and is preferably 2.5 mm.

11. The energy absorber according to claim 7, wherein a thickness of the plurality of longitudinal ribs is approximately 2.5 mm.

12. The energy absorber according to claim 4, wherein the support element is disposed on one or more transverse ribs on a side of the energy absorber adapted to face the armrest when the energy absorber is in the fitted state.

13. The energy absorber according to claim 12, wherein the support element has two supporting walls in substantially a same orientation as the longitudinal ribs, a thickness of the supporting walls being equal to or greater than that of the plurality of longitudinal ribs.

14. The energy absorber according to claim 13, wherein the ends of the supporting walls distal from the transverse ribs are connected via a connecting wall.

15. The energy absorber according to claim 1, wherein the energy absorber is formed from a material having an elongation at break of at least 10%.

16. The energy absorber according to claim 1, further comprising fastening elements integrally shaped or molded thereon.

17. The energy absorber according to claim 1, wherein the energy absorber is fastened to a vehicle door inner lining with a clip connection.

18. The energy absorber according to claim 14, wherein the supporting walls and connecting wall are connected on the same side by a reinforcing rib.

19. The energy absorber according to claim 18, wherein the reinforcing rib is aligned in a plane approximately coincident to a manufacturing tool division plane.

20. An energy absorber for use as impact protection in a door region of a motor vehicle, the energy absorber comprising:
   a plurality of transverse ribs extending in a horizontal (Y) direction and a plurality of longitudinal ribs extending in a vertical (Z) direction are integrally connected to one another to form at least one hollow chamber with a polygonal cross-section, wherein the energy absorber is adapted to absorb an impact force oriented substantially in a direction (X) perpendicular to both the Y and Z directions when the energy absorber is in a fitted state, wherein the longitudinal extension of the plurality of transverse and longitudinal ribs is in the X direction; and a support element for supporting an armrest disposed on a side of the energy absorber comprising walls, a top, and a reinforcing rib perpendicular to the walls defining a hollow chamber that runs longitudinally with respect to the door when the energy absorber is in a fitted state, wherein the support element is adapted to face the armrest when the energy absorber is in a fitted state, and wherein the support element limits buckling in a vertical (Z) direction.

* * * * *